G. HOEFER & G. A. STROHHAECKER.
WRAPPING FOR CASED MEATS.
APPLICATION FILED SEPT. 9, 1910.
982,497.
Patented Jan. 24, 1911.
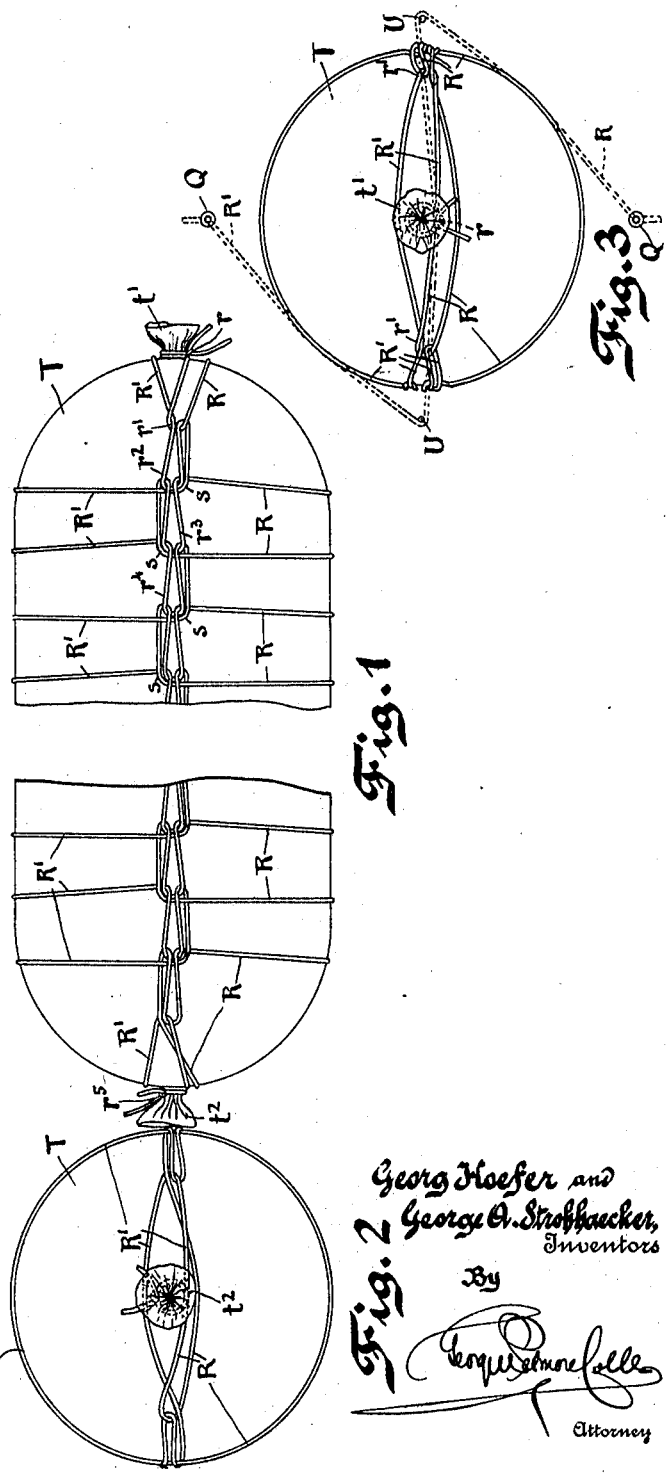

sausage in the dotted lines in Fig. 3, loops $r'$ being formed therein and temporarily held by means of hooks U or any suit-

UNITED STATES PATENT OFFICE.

GEORG HOEFER AND GEORGE ANTON STROHHAECKER, OF MILWAUKEE, WISCONSIN.

WRAPPING FOR CASED MEATS.

982,497. Specification of Letters Patent. Patented Jan. 24, 1911.

Original application filed June 16, 1909, Serial No. 502,545. Divided and this application filed September 9, 1910. Serial No. 581,234.

*To all whom it may concern:*

Be it known that we, GEORG HOEFER and GEORGE ANTON STROHHAECKER, of Milwaukee, Wisconsin, have invented a Wrapping for Cased Meats, of which the following is a specification.

This invention relates to means for automatically tying up cased meats such as sausages and hams and, in brief, any kind of meat which is stuffed into a tubular casing. At the present time it is customary in the trade to wrap such preparations securely with stout cord to hold them in shape during the smoking process; before which they are very soft and will not hold their shape, but after smoking they are sufficiently dried out and stiffened to hold their shape properly after the cord has been removed. This tying up of the meats is done by hand, and as it occupies considerable time and requires skilled operators to perform it neatly and rapidly, it forms an important item in the cost of preparing such meats.

The object of the present invention is to provide a novel form of wrapping for cased meats which can be formed by machinery if desired and will thus dispense with handwork; for example by the machine described and claimed in our United States Patent #966,746 dated August 9, 1910, which originally disclosed this novel form of stitch and of which this present application is a division.

In performing the stitching or tying operation we provide two cords which are carried in a semicircular arc halfway around the sausage on opposite sides thereof, and are mutually engaged in two rows of stitches on each side of the sausage. The stitches are of such form that when run together at the end of the casing they form a fast knot which does not become disengaged of itself and requires no other tie to hold it in place.

The nature of our invention is hereinafter more particularly described and set forth in our claims, and is illustrated in the accompanying drawing wherein—

Figure 1 is a side-view of a cased meat after being wrapped and tied, showing the cords widely separated so that their convolutions may be followed; a portion being broken out of the middle to bring the figure within the limits of the sheet; Fig. 2 is an elevation of the left-hand or finishing end of the same; and Fig. 3 is an elevation of the right-hand or beginning end.

The reference letters refer each to the same part in each figure of the drawings.

The two cords which are used to tie the sausage are for the sake of distinction designated R and R', and they may be brought from cops or spools which are mounted at convenient points, it being unnecessary in our form of wrapping that access should be had to the ends of the cords except those ends where the wrapping is begun, and which are tied together at the start in a knot $r$ around the end-tuft $t$ of the casing to form a base from which the wrapping starts. To form the wrapping, the cords are carried out to opposite sides of the sausage in the position shown in the dotted lines in Fig. 3, loops $r'$ being formed therein and temporarily held by means of hooks U or any suitable means which are provided by mechanism, or which suggest themselves to the operator, while the further portions of the cords are carried diametrically around the sausage in semicircular arcs, either by hand or by suitable devices Q, until each cord is opposite the aforesaid loop of the other cord, at which time a second loop $r^2$ thereof is passed through the first loop $r'$; that is to say, a second loop of the cord R is passed through the loop of the cord R', and a second loop of the cord R' is passed through the first loop of the cord R; said second loop being now temporarily held by the devices U, which further advance the space of one wrapping or convolution along the sausage relative to the latter, drawing the loop $r^2$ out in the direction of advance as shown in Fig. 1. The portion of each cord beyond the loop $r^2$ is also engaged by the devices U so as to make a right-angled bend $s$ therein. The devices U being now so advanced relative to the casing the distance of one stitch or convolution, the two cords are now carried back again each half-way around the sausage, in diametrically opposite relation, to the positions where they were at first, and the same operation is repeated, a third loop $r^3$ of each cord being now passed through the second loop $r^2$ of the other cord and the right-angled bend $s$ of said cord; said third loops, after being engaged by the devices U being now again drawn out by the advancement of said devices the distance of one stitch or convolution, and the latter also engaging the body of the cord so as to form a second right-angled bend $s$; and the two cords are now again returned halfway around the sausage in diametrically opposite relation the same as at first, new loops $r^4$ similar to the loops $r^2$ being passed through the previous loops $r^3$ and bends $s$, engaged by the devices U and drawn out the distance of one stitch or convolution as before; and so on indefinitely until the end of the casing is reached, at which point the cords may either continue to be engaged, forming blank stitches beyond the end, which stitches will tie together in a self-retaining manner, or said ends may be simply coiled about the end-tuft $t^2$ of the casing and tied together at $r^5$ which will absolutely prevent displacement.

It will be seen that our novel wrapping constitutes an important advance in the art since it dispenses with the necessity of cutting lengths of cord at first and having both ends accessible, and further provides for any number of circumferential wrappings (and in the case of very long casings many are desirable) with a substantial three-ply longitudinal wrapping. As it is the longitudinal wrapping which is used to support the cased meat, it is desirable that this should be the strongest. It will also be seen that the circumferential convolutions are substantially parallel and evenly disposed, which is of great importance to the proper support of the casing and its contents during the drying process.

It will be readily understood that our wrapping, while particularly adapted to be carried out by the special machine which we have invented for that purpose, may also be carried out upon machines of other designs or wholly or partly by hand.

Having thus described our invention, what we claim as new and desire to secure by Letters Patent is:

1. The combination with an elongated object of a wrapping therefor comprising a pair of cords each passing in semiconvolutions around the object, and the two semiconvolutions being complementary, the cords along the junction-lines of said semiconvolutions being looped together in stitches which engage the semiconvolutions with one another and also carry the cords in a longitudinal direction to the succeeding semiconvolutions.

2. The combination with an elongated object of a wrapping therefor comprising a pair of cords each formed into successive semiconvolutions on opposite sides of the object and the semiconvolutions of the respective cords being mutually complementary and each cord being engaged at one end of each convolution with the other cord by means of a loop formed in the first cord and passing through a bight of the second cord.

3. The combination with an elongated object of a wrapping therefor comprising a pair of cords each formed into successive semiconvolutions on opposite sides of the object and the semiconvolutions of the respective cords being mutually complementary and each cord being engaged at one end of each convolution with the other cord by means of a loop formed in the first cord and passing through a bight of the second cord and also through a loop of said second cord formed at the end of the preceding semiconvolution.

4. A stitch for a cord-wrapping wherein successive convolutions are connected by looped stitches, the cord at the end of each convolution having a loop which passes through a loop and a bight brought from the preceding convolution, said first-named loop as well as the cord lying beyond the same being carried forward in a longitudinal direction to the succeeding convolution and the loop of said succeeding convolution passing through them and holding them in place, being carried forward to the next succeeding convolution.

5. A stitch-work or seam engaging two different cords of a cord-wrapping in such manner as to engage the two cords coming from opposite directions to the seam, carry each cord lengthwise along the seam the distance of a stitch and send it off at the end of the stitch in the direction in which it came, one cord approaching the seam at the beginning of one stitch and leaving it at the end of said stitch which forms the beginning of a succeeding stitch and the other cord approaching the seam at the beginning of said succeeding stitch and leaving it at the end thereof; said seam comprising a plurality of interengaging loops formed alternately first on one cord and then on the other, each loop passing through the loop of the preceding stitch and passing forward and embracing the loop of the succeeding stitch.

6. A stitch-work or seam engaging two different cords of a cord-wrapping in such manner as to engage the two cords coming from opposite directions to the seam, carry each cord lengthwise along the seam the distance of a stitch and send it off at the end of the stitch in the direction in which it came, one cord approaching the seam at the beginning of one stitch and leaving it at the end of said stitch which forms the beginning of a succeeding stitch and the other cord approaching the seam at the beginning of said succeeding stitch and leaving it at the end thereof; said seam comprising a plurality of interengaging loops formed alternately first on one cord and then on the other, each loop passing through the loop of the preceding stitch and passing forward and embracing the loop of the succeeding stitch, said first-named loop also passing through a bight in the opposite cord from the preceding stitch and the cord after forming said loop being carried forward with it and engaged by the loop of the succeeding stitch.

In witness whereof we have hereunto set our hands in the presence of two witnesses.

GEORG HOEFER.
G. ANTON STROHHAECKER.

Witnesses:
MARY LEUTERMANN,
MAX J. LEUTERMANN.